United States Patent
Sun et al.

(10) Patent No.: US 12,137,451 B2
(45) Date of Patent: Nov. 5, 2024

(54) HARQ PROCESS HANDLING FOR MULTI-DCI MULTI-TRP OPERATION

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Jia Tang, San Jose, CA (US); Amir Farajidana, Cupertino, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,593

(22) PCT Filed: Jan. 15, 2021

(86) PCT No.: PCT/CN2021/072063
§ 371 (c)(1),
(2) Date: Sep. 21, 2021

(87) PCT Pub. No.: WO2022/151325
PCT Pub. Date: Jul. 21, 2022

(65) Prior Publication Data
US 2023/0362929 A1 Nov. 9, 2023

(51) Int. Cl.
*H04W 72/1273* (2023.01)
*H04L 1/1812* (2023.01)
*H04W 72/232* (2023.01)

(52) U.S. Cl.
CPC ....... *H04W 72/1273* (2013.01); *H04L 1/1812* (2013.01); *H04W 72/232* (2023.01)

(58) Field of Classification Search
CPC ............... H04W 72/12; H04W 72/121; H04W 72/1263; H04W 72/1273; H04W 72/232; H04L 1/1812
See application file for complete search history.

(56) References Cited

U.S. PATENT DOCUMENTS

2016/0366672 A1* 12/2016 Papasakellariou .. H04W 52/325
2017/0288743 A1* 10/2017 Nam ...................... H04L 5/006
(Continued)

FOREIGN PATENT DOCUMENTS

CN 110875804 A 3/2020
CN 112042148 A 12/2020
(Continued)

OTHER PUBLICATIONS

International Search Report and Written Opinion of the International Searching Authority directed to related International Patent Application No. PCT/CN2021/072063, mailed Oct. 12, 2021; 8 pages.
(Continued)

*Primary Examiner* — Kevin D Mew
(74) *Attorney, Agent, or Firm* — Sterne, Kessler, Goldstein & Fox P.L.L.C.

(57) ABSTRACT

Apparatuses, systems, and methods for providing downlink control for multi-TRP transmission. A network-side device may provide a downlink control information transmission to a wireless device scheduling downlink transmission to the wireless device from multiple transmission reception points. The downlink transmission may relate to Hybrid automatic repeat request process and/or system information transmission. And the downlink control information may include information about scheduling of HARQ processes from different TRPs, and/or information about scheduling of SI transmission from different TRPs. The wireless device may receive the downlink transmissions from the plurality of transmission reception points in accordance with the downlink control information.

20 Claims, 5 Drawing Sheets

---

*Receive a downlink control information transmission at least scheduling downlink hybrid automatic repeat request (HARQ) transmissions from a plurality of transmission reception points (TRPs)*
*702*

↓

*Receive downlink HARQ transmissions from the plurality of TRPs in accordance with the downlink control information transmission*
*704*

(56) References Cited

U.S. PATENT DOCUMENTS

| | | | |
|---|---|---|---|
| 2018/0270799 A1* | 9/2018 | Noh | H04L 1/1812 |
| 2020/0205149 A1* | 6/2020 | Khoshnevisan | H04L 1/1854 |
| 2020/0205150 A1* | 6/2020 | Cheng | H04W 72/21 |
| 2020/0221432 A1* | 7/2020 | Park | H04L 1/1896 |
| 2020/0228246 A1* | 7/2020 | Chendamarai Kannan | H04L 5/0053 |
| 2020/0322822 A1 | 10/2020 | Tsai | |
| 2020/0389897 A1* | 12/2020 | Mondal | H04W 16/02 |
| 2021/0007066 A1* | 1/2021 | Lin | H04W 76/11 |
| 2021/0050955 A1* | 2/2021 | Park | H04B 7/0456 |
| 2021/0051650 A1* | 2/2021 | Yi | H04W 72/21 |
| 2021/0194636 A1 | 6/2021 | Huang et al. | |
| 2022/0104187 A1* | 3/2022 | Zhou | H04L 1/1822 |
| 2022/0225361 A1* | 7/2022 | Lee | H04W 72/1268 |

FOREIGN PATENT DOCUMENTS

| | | | | |
|---|---|---|---|---|
| WO | WO-2018084663 A1 * | 5/2018 | | H04L 1/0026 |
| WO | WO-2018175805 A1 * | 9/2018 | | H04W 72/042 |
| WO | WO-2018231112 A1 * | 12/2018 | | H04L 1/1812 |
| WO | WO-2020252174 A1 * | 12/2020 | | H04L 1/1812 |
| WO | WO-2021092273 A1 * | 5/2021 | | H04L 1/1607 |

OTHER PUBLICATIONS

MediaTek Inc., "R16 maintenance of multi-TRP operation," R1-2003660, 3GPP TSG RAN WG1 Meeting#101-e, Online, May 29, 2020; 11 pages.

First Office Action directed to related Japanese Application No. 2023-542597, with English-language translation attached, mailed May 10, 2024; 8 pages.

Qualcomm Incorporated, "Discussion on impact of multi-TRP operation on RAN2," 3GPP TSG-RAN WG2 Meeting #107, Prague, Czech, Aug. 26-Aug. 30, 2019, R2-1911379; 4 pages.

* cited by examiner

HARQ PROCESS HANDLING FOR MULTI-DCI MULTI-TRP OPERATION

CROSS-REFERENCE TO RELATED APPLICATION

This application is a U.S. National Phase of International Application No. PCT/CN2021/072063, filed Jan. 15, 2021, which is hereby incorporated by reference in its entirety.

FIELD

The present application relates to wireless devices, and more particularly to apparatus, systems, and methods for HARQ process handling for Multi-DCI Multi-TRP Operation.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide improved scheduling of multi-TRP downlink transmission.

According to the techniques described herein, a network-side device may provide a downlink control information transmission scheduling downlink transmission from multiple transmission reception points to the wireless device.

In one aspect, the downlink transmission may relate to Hybrid Automatic Repeat reQuest (HARQ) process, wherein the downlink control information may include information about scheduling of HARQ processes from different TRPs to the wireless device, and optionally, the data transmitted via the downlink HARQ transmission can be configured accordingly. In another aspect, the downlink transmission may relate to system information transmission, wherein the downlink control information may include information about scheduling of SI transmission from different TRPs. And the downlink control information may further include any of various other possible types of configuration information for the downlink transmissions.

Using the downlink control information, the wireless device may receive the downlink transmissions from the plurality of transmission reception points, particularly, appropriately receive and decode the downlink transmissions from the plurality of transmission reception points.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
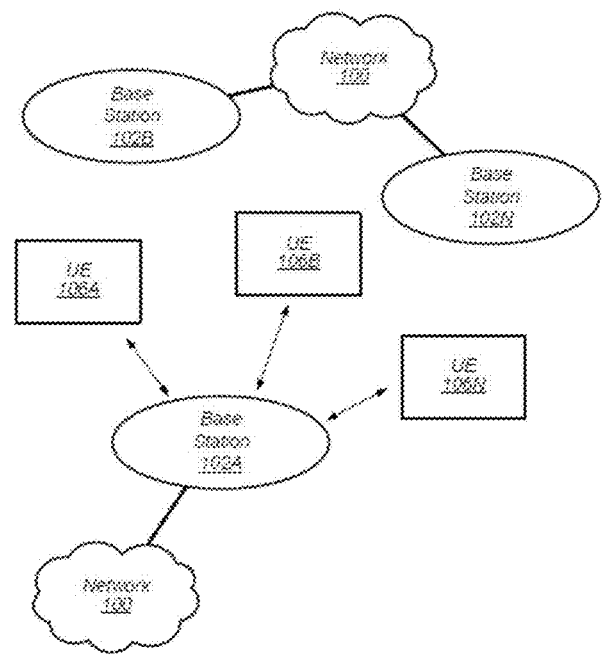
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Network-side Device—any of various types of computer systems or devices that perform communications, particularly perform wireless communication with the wireless device, such as downlink communication to the wireless device related to downlink transmission. The network-side device can be portable (or mobile) or may be stationary or fixed at a certain location. A base station is an example of a network-side device.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
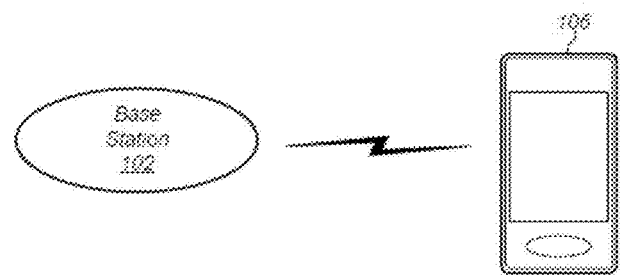
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
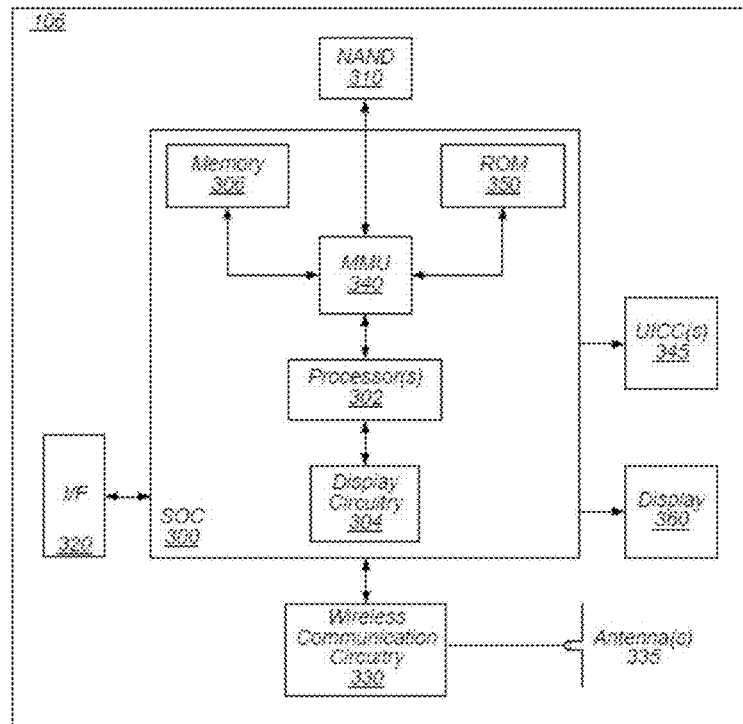
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
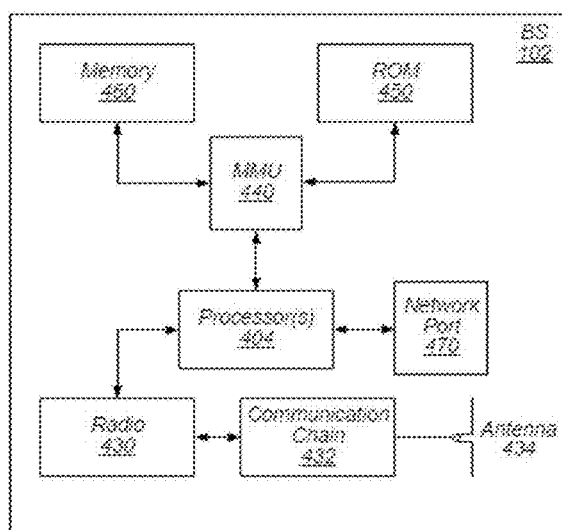
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
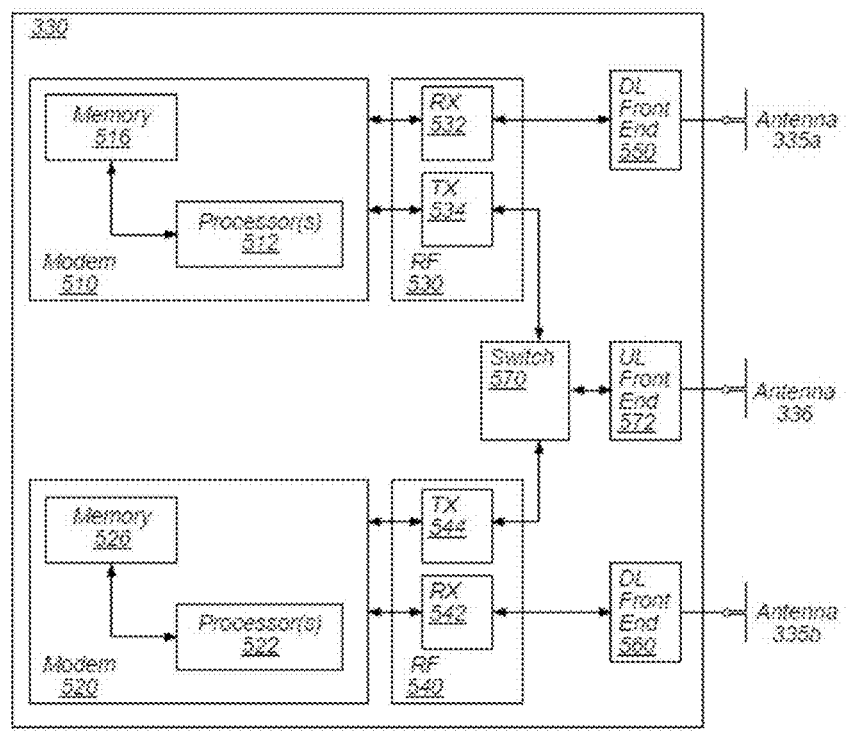
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
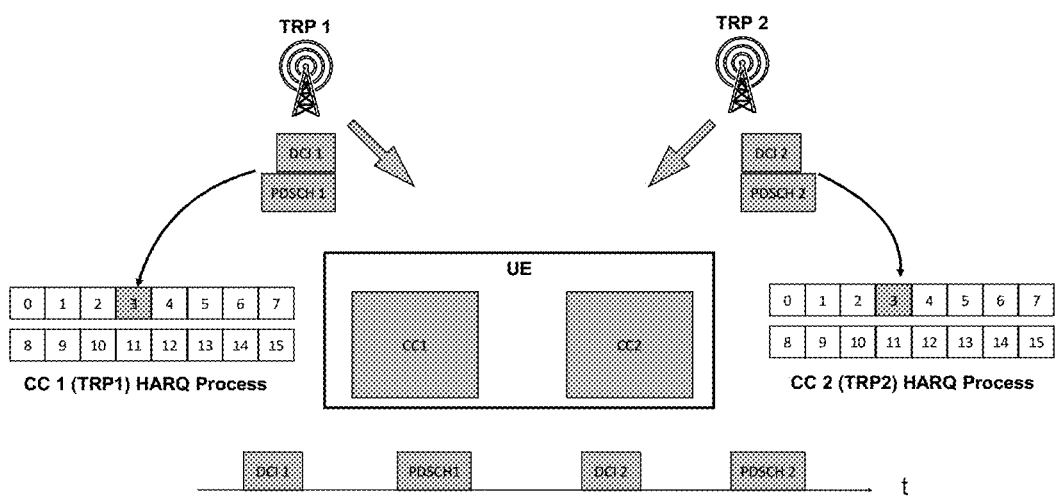
FIG. 6 illustrates an example multi-DCI based multi TRP downlink transmission.
Figure 7:
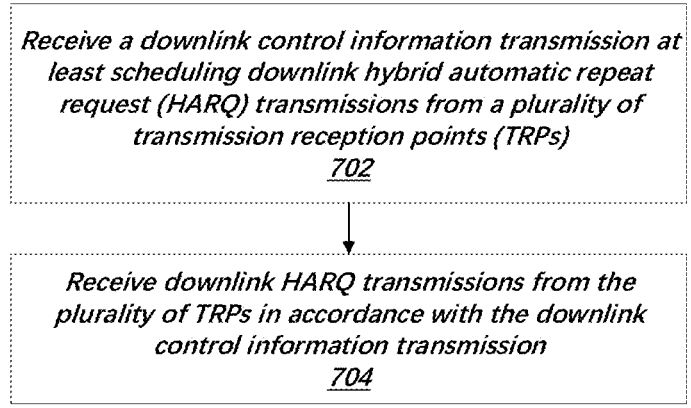
FIG. 7 is a flowchart diagram illustrating an example method for receiving downlink control information scheduling downlink transmissions from multiple transmission reception points (TRPs), according to some embodiments.
Figure 8:
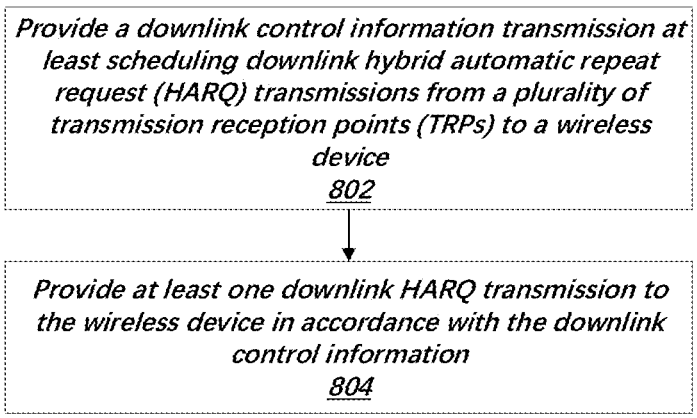
FIG. 8 is a flowchart diagram illustrating an example method for providing downlink control information scheduling downlink transmissions from multiple transmission reception points (TRPs), according to some embodiments.

FIGS. 6-8 Downlink Control for Multi-TRP Transmission

New cellular communication techniques are continually under development, to increase coverage, to better serve the range of demands and use cases, and for a variety of other reasons. One technique that is currently under development may include scheduling transmissions in which multiple TRPs can transmit downlink data to a wireless device. As part of such development, it would be useful to provide a downlink control framework that can support such a technique.

NR Rel-16 MIMO enhancement introduces the Multi-DCI based Multi-TRP operation, wherein downlink transmission from different TRPs (for example, up to two TRPs) to a single wireless device can be performed, the downlink transmission can include Downlink Control Information (DCI) transmission and downlink data transmission, and the UE can decode the downlink control information, and then acquire and process the transmitted data from TRP.

CORESETPoolIndex can be introduced to logically associated the DCI with different TRP. For each CORESET (Control-Resource Set), a CORESETPoolIndex can be configured to be either 0 or 1. If CORESETPoolIndex is not configured for a CORESET, it is assumed to be 0. A CORESET belongs to a set of physical resources including resource blocks in frequency domain and OFDM symbols in time domain. The meaning of CORESET is well known in the art and will not described in detail hereinafter.

DCIs from different CORESET with different CORESETPoolIndex can schedule corresponding data contents. For example, data content can be transmitted via, Physical Downlink Shared Channel (PDSCH), and thus can be indicated as a PDSCH, for the sake of simplicity. In particular, DCI can schedule partially, or fully, overlapping PDSCH, Out of Order (OOO) PDSCH reception, OOO PDSCH HARQ-ACK feedback, OOO PUSCH transmission, etc.

The total maximum number of CORESETs per BWP (Bandwidth Part) can be increased from 3 to 5, the maximum CORESET per CORESETPoolIndex per BWP is still 3. Since the maximum BWPs per Cell is 4, and each BWP may be configured with different bandwidth, the total maximum number of CORESETs per Cell can be increased from 12 to 16. And such CORESETs can be used for downlink DCI transmission from respective TRPs.

Considering Support of Multi-DCI based Multi-TRP operation can be difficult for the legacy UE, therefore, CA (Carrier Aggregation) architecture can be utilized to support Multi-DCI based Multi-TRP, wherein Each TRP, i.e. CORESETPoolIndex, is mapped to a different component carrier (CC), so that the downlink transmission from the TRP is directed to the corresponding CC.

However, the current HARQ process design imposes certain limitation that can make CA architecture hard. More specifically, in current HARQ process design, different TRP (CORESETPoolIndex) can schedule the same HARQ process, but this poses challenges for UE to handle HARQ processing especially when retransmission is scheduled from a different TRP (COESETPoolIndex).

More specifically, there may exist a case that a PDSCH (TB, transmission block) in a HARQ process can be scheduled by a DCI with CORESETPoolIndex, while the same PDSCH (TB) in the same HARQ process can be scheduled to be retransmitted by a DCI with different CORESETPoolIndex. As shown in FIG. 6, TRP 1 and TRP 2 schedules the same HARQ process 3, and UE receives downlink DCI and PDSCH transmissions from TRP1 via CC1, and receives downlink DCI and PDSCH transmissions from TRP2 in CC2. In such a case, the same PDSCH for HARQ are located into two different CCs which are relatively independent from each other, and processing, such as combining, the two PDSCHs in different CCs may cause the processing performance to degrade or increase UE implementation complexity.

Therefore, the present disclosure proposes solutions to handle the HARQ processing to more appropriately and efficiently support Multi-DCI Multi-TRP, the solutions are particularly suitable for the CA architecture, and note that such CA architecture is just an example, the UE can employ any other appropriate architecture for supporting Multi-DCI Multi-TRP operation, as long as the UE utilize separate resources for receiving downlink transmission from multi TRPs. For example, UE can employ resources in any appropriate scale and configure different resources for different TRPs.

According to the present disclosure, the downlink HARQ transmission can be particularly configured based on the mapping between HARQ processes and TRPs. In particularly, the downlink control information can include information indicating a variety of mapping relationships between HARQ processes and TRPs, and optionally, the data retransmitted via downlink HARQ transmission can be configured accordingly.

Accordingly, FIGS. 7 and 8 are signal flow diagrams illustrating an example of such a solution, at least according to some embodiments. Aspects of the method of FIG. 7 may be implemented by a wireless device such as a UE 106 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. Please note that such operation in FIG. 7 also can be implemented by a network device for example a base station such as a BS 102 illustrated in various of the Figures herein, if the downlink DCI and data are generated by a third-party and forwarded to the wireless device via the base station, and the third-party can be any appropriate device in the communication system.

In various embodiments, some of the elements of the methods shown may be performed concurrently, in a different order than shown, may be substituted for by other method elements, or may be omitted. Additional elements may also be performed as desired.

As shown, the method of FIG. 7 may operate as follows. At 702, a wireless device may receive a downlink control information (DCI) transmission at least scheduling downlink hybrid automatic repeat request (HARQ) transmissions from a plurality of transmission reception points (TRPs). In particular, DCI may include information indicating any of a variety of mapping relationships between HARQ process and TRP. The DCI can set/configured by any appropriate party, such as the network-side device, a controlling device in the system, a TRP, and so on. Optionally, the data, such as PDSCH, via the downlink transmission may be configured accordingly, and particularly, the data can be configured in accordance with the information of mapping relationship. At 704, the wireless device may receive downlink HARQ transmissions from the plurality of TRPs in accordance with the downlink control information transmission. This may include receiving and decoding each of the multiple downlink transmissions in accordance with various parameters and configuration information provided in and/or determined based on the DCI.

The DCI may be provided in any of a variety of possible formats. At least according to some embodiments, the wireless device may receive an indication of which of multiple possible formats is being used to provide the DCI. For example, such information may be broadcast by a base station to which the wireless device is attached in a system information broadcast, among various other possibilities.

As one possible format, the DCI may be provided as a single DCI transmission from a cellular base station that includes scheduling information for multiple downlink data streams. The cellular base station may provide all of the multiple TRPs from which the downlink transmissions are scheduled, or may provide only a subset of the multiple TRPs from which the downlink transmissions are scheduled, while one or more of the TRPs from which the downlink transmissions are scheduled could be provided by one or more other cellular base stations, according to some embodiments.

In case of a single DCI transmission being used to schedule the multi-TRP transmission, the DCI may include entirely separate/independent scheduling information for each downlink data stream, or may include some scheduling information that is common to the downlink data streams and some scheduling information that is separate/independent for each of the downlink data streams, e.g., to more efficiently communicate the scheduling information.

At least in some instances, the DCI may include information that can be used by the wireless device to determine the frequency domain resource allocations for the downlink transmissions. For example, as one possibility, the DCI may include an indication of the frequency domain resource allocation for each of the downlink transmissions, such that the wireless device may be able to determine the frequency domain resource allocation for each of the downlink transmissions based at least in part on the indication of the frequency domain resource allocation for each of the downlink transmissions. As another possibility, the DCI may include a frequency domain resource allocation indicator that configures frequency resources for all of the downlink transmissions. For example, the frequency domain resource allocation indicator could include any appropriate information related to resource block index for each of the downlink transmissions, so that the wireless device can determine the frequency domain resource allocation for each of the downlink transmissions based on the information, such as by computation for resource block index, such as start and end index, for the frequency domain resource allocation.

According to some embodiments, the DCI may include information that can be used by the wireless device to determine the modulation and coding scheme (MCS) and a redundancy version (RV) for each of the downlink transmissions. For example, as one possibility, the DCI may include an indication of the MCS and the RV for each of the downlink transmissions, such that the wireless device may be able to determine the MCS and the RV for each of the downlink transmissions based at least in part on the indication of the MCS and the RV for each of the downlink transmissions. Of course, DCI may include any other appropriate information available for determining MSC and RV for each of downlink transmissions.

According to some embodiments, the downlink transmissions may include physical downlink shared channel (PDSCH) blocks that are provided by the multiple TRPs using frequency division multiplexing techniques, e.g., such that the different PDSCH blocks have different frequency resource allocations, which may each include a certain number of resource blocks (RBs).

Thus, the method of FIG. 7 may be used by multiple TRPs and a wireless device to schedule and perform a multi-TRP downlink communication to the wireless device, at least according to some embodiments.

FIG. 8 may be implemented by a network-side device for example a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

As shown, the method of FIG. 8 may operate as follows. At 802, the network-side device may provide a downlink control information (DCI) transmission at least scheduling downlink hybrid automatic repeat request (HARQ) transmissions from a plurality of transmission reception points (TRPs) to a wireless device. In particular, DCI may include information indicating any of a variety of mapping relationships between HARQ process and TRP, and may further comprises other appropriate information as discussed above, and optionally, the data, such as PDSCH, via the downlink transmission may be configured accordingly. Note that such DCI and data can be configured/set by the network-side device, or can be received from other appropriate device. At 804, the network-side device may provide at least one downlink HARQ transmission to the wireless device in accordance with the downlink control information.

Thus, the method of FIG. 8 may be used by multiple TRPs and a network-side device, such as a base station, to schedule and perform a multi-TRP downlink communication to the wireless device, at least according to some embodiments.

Figure 9:
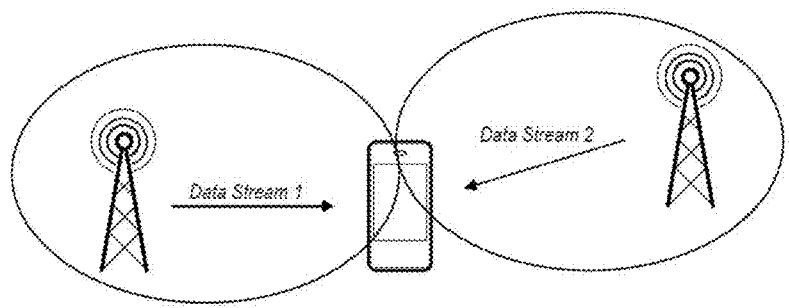
FIG. 9 illustrates an example scenario in which two TRPs schedule two data streams to a wireless device, according to some embodiments.
Figure 10:
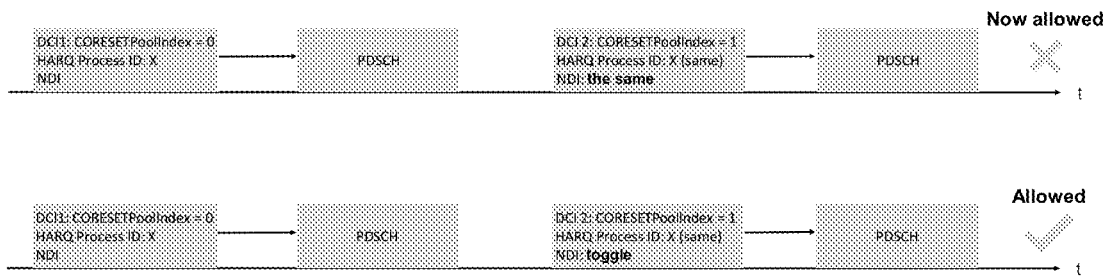
FIG. 10 illustrates an example in which transmission of the same HARQ process from different TRPs are scheduled based on New Data Indicator (NDI).
Figure 11:
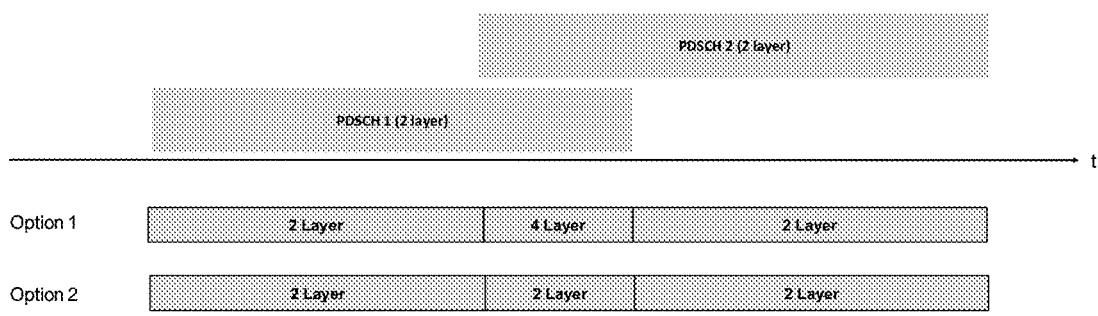
FIG. 11 illustrates exemplary calculation options for number of maximum layers in PDSCH overlapping.

FIGS. 9-11 illustrate further aspects that might be used in conjunction with the method of FIGS. 7 and 8 if desired. It should be noted, however, that the exemplary details illustrated in and described with respect to FIGS. 9-11 are not intended to be limiting to the disclosure as a whole: numerous variations and alternatives to the details provided herein below are possible and should be considered within the scope of the disclosure.

FIG. 9 illustrates an example scenario in which two transmission reception points (TRPs) schedule two data streams to a wireless device, according to some embodiments. Such multi-TRP operation may include non-coherent joint transmission (NCJT) communication, as one possibility. Other forms of multi-TRP operation are also possible. There may be a variety of options for providing a signaling framework for scheduling such multi-TRP operation. As one possibility, a single downlink control information (DCI) communication may be used to schedule different physical downlink control channel (PDSCH) blocks for a UE from different TRPs. The different PDSCH blocks may be provided using a frequency division multiplexing scheme, as one possibility. As a still further possibility, a spatial domain multiplexing (SDM) based approach to providing different PDSCH blocks from different TRPs to a UE may be used. In such a scenario, it may be the case that different demodulation reference signal (DMRS) ports can correspond to different TRPs.

Hereinafter some embodiments of the present disclosures are described.

According to some embodiments of the present disclosure, the downlink HARQ transmission, particularly DCI and optionally, PDSCH data, can be configured in a variety of manners so as to more appropriately support Multi-TRP. In particular, DCI in the downlink transmission can be configured in accordance with any of the following setting: whether HARQ processes from different TRPs can be scheduled by the same indicator; whether conditional retransmission of HARQ processes from different TRPs scheduled by the same indicator can be allowed, and other appropriate strategy, and optionally, PDSCH data can be configured accordingly.

According to some embodiments of the present application, DCI can include information reflecting such settings, the information can be presented in any manner, for example, can be presented by mapping relationship between HARQ process and TRP. For example, a HARQ process may indicated by a HARQ process indicator, such as HARQ process ID, and a TRP may be indicated by a TRP indicator, such as CORESETPoolIndex as an example, so that the mapping relationship between HARQ process and TRP may represented by mapping relationship between HARQ process indicator and TRP indicator. And DCI may be configured as including any other appropriate information to reflect such strategy.

According to some embodiments of the present disclosure, downlink HARQ transmission from multi-TRP to the wireless device can be configured so that HARQ processes from different TRPs cannot be scheduled by the same indicator. And in such a solution, the wireless device acquiring and combining of data corresponding to the HARQ process with the same HARQ indicator from different CC can be avoided, and the performance degradation can be alleviated.

Such a solution can be referred to HARQ process partition, and for this, network-side device can send RRC configuration message to a wireless device, so that the mapping between DCI (more accurately CORESET) to TRP (CORESETPoolIndex) is semi-statically configured. Additionally or optionally, DCI can include an information indicating HARQ processes from different TRPs are different from each other. For example, the downlink control information transmission may comprise a HARQ process indicator and a TRP indicator for each HARQ process whose mapping relationship is configured that HARQ processes corresponding to different TRP indicators are assigned HARQ process indicators different from each other. That is, each HARQ process from a TRP has a HARQ process indicator different from that of any HARQ process from another different TRP. And in such a case, the PDSCH data transmitted in the downlink HARQ transmission can configured as usual.

According to some embodiments, such mapping relationship can be fixedly configured, for example, unchanged during operation. For example, Currently, for each CC, UE is mandated to support 16 HARQ processes, and for two TRPs, 8 HARQ processes are allocated to each TRP with different indicators, as follows.

For a TRP with CORESETPoolIndex=0,
   allocated HARQ Process ID={0, 1, 2, 3, 4, 5, 6, 7}
For another TRP CORESETPoolIndex=1,
   allocated HARQ Process ID={8, 9, 10, 11, 12, 13, 14, 15}.

According to some embodiments, such mapping relationship can be semi-statically configured, and for example, such mapping relationship can be configured based on the wireless device's capability supporting HARQ processes.

For example, for a case that a UE can support 32 HARQ processes, and there exists two TRPs, when HARQ process ID is semi-statically configured to a particular CORESETPoolIndex, in the CC that is configured with Multi-DCI Multi-TRP operation, for each CORESETPoolIndex indicating a TRP, a network-side device can only schedule maximum 16 different HARQ processes, and different CORESETPoolIndex cannot schedule the same HARQ process. Of course, 32 HARQ processes are only exemplary, other number of HARQ processes can be configured/set.

According to some embodiments of the present disclosure, whether UE requires the above static or semi-static configuration of CORESETPoolIndex to HARQ process ID mapping can be obtained by the communication system in advance, such as by a network-side device or any appropriate third-party device, for implementing such configuration in DCI. Alternatively or additionally, whether UE requires the above static or semi-static configuration can be reported by the wireless device when the HARQ process downlink transmission is initially set or the Multi-TRP operation is configured. Such reported information can be presented in a variety of manners, such as a bit, a field, a command, a signal, etc. For example, UE report its capability whether UE requires semi-static configuration, such as in a bit, and consequently, support of 32 HARQ processes per Multi-DCI Multi-TRP CC, such as in another bit.

According to some embodiments of the present disclosure, even if HARQ processes from different TRPs can be scheduled by the same indicator, downlink transmission of HARQ processes from different TRPs with the same HARQ indicators can be only implemented conditionally, that is, under some restrictions/constraints or based on some certain considerations. The restrictions/constraints or considerations may relate to the wireless device's capability of obtaining and processing the PDSCH data, or the wireless device's performance requirement when processing the PDSCH data from the same HARQ process from different TRPs, or other capability/performance which may adversely affected by the case that HARQ processes from different TRPs can be scheduled by the same indicator.

According to some embodiments of the present disclosure, DCI for downlink HARQ transmission from multi-TRP to the wireless device can be configured as including an information indicating HARQ processes with same indicators can be scheduled from different TRPs under some conditions. In such a case, DCI may include an information indicating mapping relationships between HARQ process and TRP, and optionally other information indicating the condition, and/or the data transmitted via the downlink HARQ process can be set based on the condition accordingly.

According to some embodiments of the present disclosure, the downlink HARQ processes from multi-TRPs can be configured so that the retransmission of the same HARQ process cannot be scheduled from a different TRP, that is, HARQ process from different TRPs with the same HARQ indicator cannot implement the retransmission, for example, for HARQ process from different TRPs with the same HARQ indicator, only new data contents (new transmission) can be scheduled. According to some embodiments, DCI that indicates the retransmission of the same HARQ process cannot be scheduled from a different TRP.

According to some embodiments of the present disclosure, the downlink control information transmission may comprise a HARQ process indicator, a TRP indicator, and a retransmission data indicator for each HARQ process, wherein at least some of HARQ processes corresponding to different TRP indicators have the same HARQ process indicator assigned thereto, and wherein the retransmission data indicator for the HARQ processes corresponding to different TRP indicators and the same HARQ processor indicator indicates data re-transmitted by the HARQ processes are different from each other. Equivalently, the network-side device cannot schedule the retransmission of a HARQ process using the same HARQ process ID from a different TRP. And in such a case, the PDSCH data transmitted via in the downlink HARQ transmission can be configured as usual.

In an example, New Data Indicator (NDI) may be an example of the retransmission data indicator, and HARQ processes for different TRPs with the same HARQ indicators, if wanted to be scheduled, would have different NDI. If NDI is the same as the previous NDI, which means retransmission, not allowed. If NDI is different (toggle) from the previous NDI, it is new transmission, which is allowed. NDI can be set any appropriate data or symbol. For example, NDI is either 0 or 1. For example, for Multi-DCI Multi-TRP, in the same scheduled CC, the retransmission of the same HARQ processing cannot be scheduled from a different CORESETPoolIndex (TRP). When Multi-DCI Multi-TRP is configured, when DCI with CORESETPoolIndex i schedules a PDSCH reception with HARQ process ID, DCI with different CORESETPoolIndex j cannot schedule the retransmission of the same PDSCH with the same HARQ Processing ID (not toggling NDI, New Data Indicator, field). An example is as shown in FIG. 10.

In another example, the retransmission data indicator in the DCI can indicate the data is same or not, and even when the data is same, the corresponding DCI and PDSCH can still be scheduled, and in such a case, the wireless device can receive the DCI and when identify that the retransmission data indicator indicates the data is not changed, that is, HARQ processes for different TRPs with the same HARQ indicators retransmit the same data, such DCI and its corresponding PDSCH will be abandoned.

According to some embodiments of the present disclosures, the restriction/constraint/consideration may relate to the data the wireless device can accept when receiving the retransmission from the same HARQ process from different TRPs. In particular, if different TRP can schedule the retransmission of the same HARQ process, the data retransmitted via the HARQ process shall be configured/limited accordingly, and particularly, the data shall be configured with a size smaller than or equal to a size threshold. In one example, the size threshold may be a data size which would not cause the performance/efficiency of the wireless device when processing the data significantly degrade, or the degradation is within tolerable limits. That is, when the wireless device receives and processes the data retransmitted via the same HARQ process from different TRPs, even the performance/efficiency may be somewhat degraded, it can be accepted and still be better than without such restriction. Of course, the size threshold can be set based on other considerations.

According to some embodiments of the present disclosures, the downlink control information transmission may comprise a HARQ process indicator and a TRP indicator for each HARQ process, wherein at least some of HARQ processes corresponding to different TRP indicators have the same HARQ process indicator assigned thereto, and wherein the wireless device can be further configured to acquire data re-transmitted by the HARQ processes corresponding to different TRP indicators and the same HARQ indicator which have a size smaller than a specific threshold.

According to some embodiments, the specific threshold is preset fixedly, or set based on the maximum payload size the wireless device is capable of processing for the HARQ processes from different TRPs that can be scheduled by the same HARQ process indicator. The threshold can be set at the network-side device or any other device in the system, or can be set and reported by the wireless device.

For example, if different TRPs (CORESETPoolIndex) can schedule the retransmission of the same HARQ process, further introduce the maximum TB size (MCS) that UE is expected for this case, and the maximum TB (MCS) can be handed coded as fixed value in the specification, or the maximum TB (MCS) can be indicate as UE capability. And the maximum TB size can be determined based on experiments in advance, or determined in any other appropriate manners. In an example, the maximum TB size can be pre-obtained by the system or the information about the maximum TB size, such as the maximum TB size per se or its corresponding index, can be reported by the wireless device before multi-TRP operation, so as to be utilized to limit the re-transmitted data before the multi-TRP HARQ downlink transmission. In another example, the re-transmitted data can be remained as usual during the multi-TRP HARQ downlink transmission, and when receiving the data, the wireless device can selectively utilize a portion of the data with the maximum TB size for processing.

According to some embodiments, the restriction/constraint/consideration may relate to the performance requirement the wireless device is required to meet when processing data retransmitted via same HARQ process from different TRPs. In particular, if different TRP can schedule the retransmission of the same HARQ process, the data retransmitted via the HARQ process shall be configured/limited accordingly, so that when the wireless device receives and processes the data retransmitted from same HARQ process from different TRPs, the performance requirement can be still satisfied. In an example, the performance requirement can be any of a minimum performance requirement, worst acceptable performance, etc.

According to some embodiments, if retransmission via the same HARQ process from different TRPs can be scheduled, the downlink control information transmission can comprise a HARQ process indicator and a TRP indicator for each HARQ process, wherein at least some of HARQ processes corresponding to different TRP indicators have the same HARQ process indicator assigned thereto, and wherein the wireless device can be further configured to acquire data re-transmitted by the HARQ processes corresponding to different TRP indicators and the same HARQ indicator which are configured based on minimum performance requirement the wireless device is required to meet when it is supported that HARQ processes from different TRPs can be scheduled by the same HARQ process indicator.

According to some embodiments, the minimum performance requirement can be appropriately set in a variety of manners. In an embodiment, the minimum performance requirement can be set as null, that is, no minimum performance requirement is set and thus the data can be transmitted unchanged. In another embodiment, the minimum performance requirement can be set based on the manner of the wireless device processing the re-transmitted data. For example, the manner may include a manner that the wireless device combines the data from same process of different TRPs, or a manner that the wireless device only processes the latest data from same process of different TRPs.

In an example, for the Multi-DCI Multi-TRP related UE demodulation performance requirement, there are the following options:

Option 1: There is no UE minimum performance requirement when retransmission of the same TB (HARQ Process) is scheduled from a different CORESETPoolIndex.

Option 2: The UE minimum performance requirement is only based on the selective combing when retransmission of the same TB (HARQ Process) is scheduled from a different CORESETPoolIndex.

Option 2: The UE minimum performance requirement is only based on the combing among the retransmission scheduled by the same CORESETPoolIndex when retransmission of the same TB (HARQ Process) is scheduled from a different CORESETPoolIndex.

The minimum performance requirement can be determined based on experiments in advance, or determined in any other appropriate manners, and can be presented in a variety of manners, such as data size, data type, and so on. An information related to the minimum performance requirement can be pre-obtained by the system or reported by the wireless device before multi-TRP operation so as to be utilized to limit the re-transmitted data before the multi-TRP HARQ downlink transmission. In another example, the re-transmitted data can be remained as usual during the multi-TRP HARQ downlink transmission, and when receiving the data, the wireless device can selectively utilize a portion of the data selected based on the minimum performance requirement.

According to some embodiments of the present disclosure, the HARQ downlink transmission can restrict/constraint the re-transmitted data by means of a specific information, which can indicate whether data process can avoid complex processing, such as RV configuration for the transmission. In an example, RV configuration can be utilized to remain data retransmitted which can avoid complex processing, such as combining process. For example, only data which can avoid complex processing, such as be self-decodable, and its corresponding RV, can be remained and re-transmitted, while other RVs and corresponding data will not re-transmitted. In another example, RV configuration can indicate which data can avoid complex processing, so that the wireless device can selectively processing the data according to the RV configuration information.

According to some embodiments, DCI can include an information indicating the re-transmitted data can avoid complex processing, such as can be self-decodable. According to some embodiment, the downlink control information transmission may comprise a HARQ processor indicator, a TRP indicator and a redundancy version (RV) configuration information for each HARQ process, wherein at least some of HARQ processes corresponding to different TRP indicators have the same HARQ process indicator assigned thereto, and wherein the RV configuration information for the HARQ processes corresponding to different TRP indicators and the same HARQ processor indicator indicates data re-transmitted by the HARQ processes and indicated by the RV is self-decodable, and wherein the wireless device may be further configured to acquire data re-transmitted by the HARQ processes corresponding to different TRP indicators and the same HARQ indicator and indicated by the RV, and self-decode the data. Self-decode is for wireless device to decode the data based on the HARQ process in one TRP without combining of the HARQ process from the other TRP.

For example, for the Redundancy Version (RV) configuration, when retransmission of the same TB (HARQ Process) is scheduled from a different CORESETPoolIndex, UE is expected to be configured with RV that is self-decodable, i.e., without combing different retransmission of the same TB from different CORESETPoolIndex.

According to some embodiments, information about whether conditional retransmission of HARQ processes from different TRPs scheduled by the same indicator can be allowed can be preset in the system, or can be reported by the UE before the Multi-TRP operation. In particular, the information about the restriction conditions, such as information about the retransmission data indicator, the data threshold, the performance requirement, the RV configuration, can be preset in advance, or reported by the wireless device. And the information can be reported in a variety of manners, such as a bit, a field, a command, a signal, etc.

For example, such restriction transmission is always required when Multi-DCI Multi-TRP operation is configured, or such restriction can be set in accordance with the UE's requirement/request. That is, when Multi-DCI Multi-TRP operation is configured, and the UE requires/request such restriction, such restriction can be set. Such UE requirement/request can be notified to the network side device in a variety of manners. In an embodiment, UE can report its requirement via new commands/instructions/signals/information, such as newly introduced commands, newly introduced UE capability. In another embodiment, UE can report its requirement via existing commands/instructions/signals/information, such as via different values thereof, or an existing value thereof can be given new meaning to indicate support for conditional HARQ retransmission.

For example, Whether HARQ retransmission restriction is needed, can have the following options:

Option 1: It is always required when Multi-DCI Multi-TRP operation is configured;

Option 2: It is based on newly introduced UE capability, UE reports that it requires the HARQ retransmission restriction Option 3: It is conditioned on the existing UE capability reporting. As an example, As FG16-2a-2, UE reports whether UE supports Out of Order DL operation. If UE indicates UE support FG16-2a-2, UE requires the HARQ retransmission restriction. Other existing UE capability reporting is possible, such as other possible candidate FGs, for example, FG16-2a-1, FG16-2a-2 for overlapping PDSCH, FG16-2a-5 for the separate or joint CRS rate matching.

According to some embodiments, the solution related to HARQ transmission from different TRPs can be utilized to schedules downlink system information (SI) transmissions from a plurality of transmission reception points (TRPs). Note that scheduling of downlink system information (SI) transmissions can be combined with scheduling of HARQ transmission from different TRPs, for example, during initialization before Multi-TRP operation, and alternatively, scheduling of downlink system information (SI) transmissions can be applied independently.

According to some embodiments, wherein the system information comprises a number of system information blocks (SIBs), and DCI for system information transmission can include an information indicating mapping relationship between system information blocks and TRPs. According to some embodiments, DCI for system information transmission can include an information indicating that all system information blocks are transmitted by the same TRP, and for example, such information may be presented by all system information portions mapping to the same TRP, such as IDs of all system information blocks all mapped to the same TRP indicator. According to some embodiments, DCI for system information transmission can include an information indicating the number of system information blocks can be transmitted by different TRPs and the system information blocks from the same TRP shall be contained in the same system information transmission window, and for example, DCI may include system information block ID and TRP indicator corresponding to each other, and system information block ID from different TRP indicator cannot correspond to the same system information window, and a system information window only corresponds to system information block ID from the same TRP indicator.

Hereinafter, an example related to system information (SI) reception in Multi-TRP operation will be described. The System information (SIB) reception related Search Space and CORESET configuration may include a SIB1 reception and a SIB other than SIB1 reception. The SIB1 reception may relate to or correspond to Type0-PDCCH CSS (Common Search Space), which may include or relate to searchSpaceZero (only CORESETPoolIndex 0), pdcch-ConfigSIB1 (only CORESETPoolIndex 0), and searchSpaceSIB1 (this can be configured with CORESET with either CORESETPoolIndex 0 or CORESETPoolIndex 1). The SIB other than SIB1 reception may relate to or correspond to Type0A-PDCCH CSS (Common Search Space), which may include or relate to searchSpaceOtherSystemInformation (this can be configured with CORESET with either CORESETPoolIndex 0 or CORESETPoolIndex 1). And UE is only required to maintain one HARQ process for SI reception.

In a Multi-DCI Multi-TRP operation CC, if UE is configured with the following both:
  searchSpaceSIB1 for Type0-PDCCH CSS set by PDCCH-ConfigCommon
  searchSpaceOtherSystemInformation for Type0A-PDCCH CSS set by PDCCH-ConfigCommon
The following solution can be adopted, either one for both:
  Solution 1: UE is expected that the same CORESETPoolIndex is configured for both searchSpaceSIB1 and searchSpaceOtherSystemInformation
  Solution 2: When different CORESETPoolIndex is configured for searchSpaceSIB1 and searchSpaceOtherSystemInformation, UE is not expected SIB1 to be configured in any other SIB in the same SI window scheme may relate to relax performance requirement.

According to some embodiments of the present disclosures, the layers occupied by data transmitted via the downlink HARQ process in the multi-TRP operation can be configured based on the UE's capability, for example, the maximum number of layers UE can support and receive data therefrom. Therefore, the data can be only arranged in the configured layers and then transmitted via the downlink HARQ process in the multi-TRP operation. For example, the data can be arranged in at most the maximum number of support layers. And alternatively, the data can be transmitted as usual, and when the data is beyond the maximum number of layers, the UE can discard the data, or selectively acquire or utilize the data included in maximum number of layers.

According to some embodiments, the maximum number of support layers can be determined in a variety of manners. In an embodiment, the maximum number of layers can be the sum of layers across all scheduled data overlapping in the time domain. In an embodiment, the maximum number of support layers can be the maximum number of layers across all scheduled data overlapping in the time domain.

According to some embodiments, such UE's capability related to the maximum number of layers can be pre-obtained by the network-side device, or can be reported by the wireless device, such as before the Multi-TRP. In an example, UE can report the maximum number of layers. In another example, UE can report the determination manner of the maximum number of layers, and then the network-side device can determine the maximum number of layers per se and utilize it for downlink transmission.

For example, When UE reports the maximum MIMO layer UE can support per CC per band per BC (FSPC), for Multi-DCI based Multi-TRP scheduling, there are three options:
  Option 1: The number of MIMO layers is counted as the total number of PDSCH layers across all scheduled PDSCH overlapping in the time domain, in any symbol;
  Option 2: The number of MIMO layers is counted as the maximum number of PDSCH layers across all scheduled PDSCH overlapping in the time domain, in any symbol.
Such two operations are as shown in FIG. 11.

In the following further exemplary embodiments are provided.

One set of embodiments may include a wireless device, comprising: at least one antenna; at least one radio coupled to the at least one antenna; and a processor coupled to the at least one radio; wherein the wireless device is configured to receive a downlink control information transmission at least scheduling downlink hybrid automatic repeat request (HARQ) transmissions from a plurality of transmission reception points (TRPs); and receive downlink HARQ transmissions from the plurality of TRPs in accordance with the downlink control information transmission.

According to some embodiments, the downlink control information transmission comprises a HARQ process indicator and a TRP indicator for each HARQ process, wherein HARQ processes corresponding to different TRP indicators are assigned HARQ process indicators different from each other.

According to some embodiments, the downlink control information transmission comprises a HARQ process indicator, a TRP indicator, and a retransmission data indicator for each HARQ process, wherein at least some of HARQ processes corresponding to different TRP indicators have the same HARQ process indicator assigned thereto, and wherein the retransmission data indicators for the HARQ processes corresponding to different TRP indicators and the same HARQ processor indicator indicates data re-transmitted by the HARQ processes are different from each other.

According to some embodiments, the downlink control information transmission comprises a HARQ process indicator and a TRP indicator for each HARQ process, wherein at least some of HARQ processes corresponding to different TRP indicators have the same HARQ process indicator assigned thereto, and wherein the wireless device is further configured to acquire data re-transmitted by the HARQ processes corresponding to different TRP indicators and the same HARQ indicator which have a size smaller than a specific threshold.

According to some embodiments, the specific threshold is preset fixedly, or set based on the maximum payload size the wireless device is capable of processing for the HARQ processes from different TRPs that can be scheduled by the same HARQ process indicator.

According to some embodiments, the downlink control information transmission comprises a HARQ process indicator and a TRP indicator for each HARQ process, wherein at least some of HARQ processes corresponding to different TRP indicators have the same HARQ process indicator assigned thereto, and wherein the wireless device is further configured to acquire data re-transmitted by the HARQ processes corresponding to different TRP indicators and the same HARQ indicator which are configured based on minimum performance requirement the wireless device is required to meet when it is supported that HARQ processes from different TRPs can be scheduled by the same HARQ process indicator.

According to some embodiments, the downlink control information transmission comprise a HARQ processor indicator, a TRP indicator and a redundancy version (RV) configuration information for each HARQ process, wherein at least some of HARQ processes corresponding to different TRP indicators have the same HARQ process indicator assigned thereto, and wherein the RV configuration information for the HARQ processes corresponding to different TRP indicators and the same HARQ processor indicator indicates data re-transmitted by the HARQ processes and indicated by the RV is self-decodable, and wherein the wireless device is further configured to acquire data re-transmitted by the HARQ processes corresponding to different TRP indicators and the same HARQ indicator and indicated by the RV, and self-decode the data.

According to some embodiments, the downlink control information transmission further schedules downlink system information (SI) transmissions from a plurality of transmission reception points (TRPs).

According to some embodiments, the system information comprises a number of system information portions, wherein the downlink control information indicates the number of system information portions are transmitted by the same TRP, or wherein the downlink control information indicates the number of system information portions are transmitted by different TRPs and the system information portions from the same TRP are contained in the same system information transmission window.

Another set of embodiments may include a network-side device, comprising: at least one antenna; at least one radio coupled to the at least one antenna; and a processor coupled to the at least one radio; wherein the network-side device is configured to: provide a downlink control information transmission at least scheduling downlink hybrid automatic repeat request (HARQ) transmissions from a plurality of transmission reception points (TRPs) to a wireless device; and provide at least one downlink HARQ transmission to the wireless device in accordance with the downlink control information.

According to some embodiments, the network-side device is further configured to configure the downlink control information transmission based on whether it is supported that HARQ processes from different TRPs can be scheduled by the same HARQ process indicator, or whether it is supported that retransmission of HARQ processes from different TRPs corresponding to the same HARQ process indicator can be performed under a specific restriction.

According to some embodiments, the network-side device is further configured to: under a condition that HARQ processes from different TRPs cannot be scheduled by the same HARQ process indicator, configure the downlink control information transmission so that the downlink control information transmission comprises a HARQ process indicator and a TRP indicator for each HARQ process, wherein HARQ processes corresponding to different TRP indicators are assigned HARQ process indicators different from each other.

According to some embodiments, the network-side device is further configured to: under a condition that retransmission of HARQ processes from different TRPs corresponding to the same HARQ process indicator can be performed under a specific restriction, and configure the downlink control information transmission so that the downlink control information transmission comprises a HARQ process indicator, a TRP indicator, and a retransmission data indicator for each HARQ process, wherein at least some of HARQ processes corresponding to different TRP indicators have the same HARQ process indicator assigned thereto, and wherein the retransmission data indicators for the HARQ processes corresponding to different TRP indicators and the same HARQ processor indicator indicates data re-transmitted by the HARQ processes are different from each other.

According to some embodiments, the network-side device is further configured to: under a condition that retransmission of HARQ processes from different TRPs corresponding to the same HARQ process indicator can be performed under a specific restriction, configure the downlink control information transmission so that the downlink control information transmission comprises a HARQ process indicator and a TRP indicator for each HARQ process, wherein at least some of HARQ processes corresponding to different TRP indicators have the same HARQ process indicator assigned thereto, and provide, in the downlink HARQ transmission, data to be re-transmitted by the HARQ processes corresponding to different TRP indicators and the same HARQ indicator which have a size smaller than a specific threshold.

According to some embodiments, the network-side device is further configured to: under a condition that retransmission of HARQ processes from different TRPs corresponding to the same HARQ process indicator can be performed under a specific restriction, configure the downlink control information transmission so that the downlink control information transmission comprises a HARQ process indicator and a TRP indicator for each HARQ process, wherein at least some of HARQ processes corresponding to different TRP indicators have the same HARQ process indicator assigned thereto, and provide, in the downlink HARQ transmission, data to be re-transmitted by the HARQ processes corresponding to different TRP indicators and the same HARQ indicator which are configured based on minimum performance requirement the wireless device is required to meet when it is supported that HARQ processes from different TRPs can be scheduled by the same HARQ process indicator.

According to some embodiments, the network-side device is further configured to: under a condition that retransmission of HARQ processes from different TRPs corresponding to the same HARQ process indicator can be performed under a specific restriction, configure the downlink control information transmission so that the downlink control information transmission comprises a HARQ processor indicator, a TRP indicator and a redundancy version (RV) configuration information for each HARQ process, wherein at least some of HARQ processes corresponding to different TRP indicators have the same HARQ process indicator assigned thereto, and wherein the RV configuration information for the HARQ processes corresponding to different TRP indicators and the same HARQ processor indicator indicates data re-transmitted by the HARQ processes and indicated by the RV is self-decodable, and provide, in the downlink HARQ transmission, data to be re-transmitted by the HARQ processes corresponding to different TRP indicators and the same HARQ indicator in accordance with the RV.

According to some embodiments, the network-side device is further configured to: provide a downlink control information transmission further scheduling downlink system information (SI) transmissions from a plurality of transmission reception points (TRPs) to a wireless device, and provide at least one downlink SI transmission to the wireless device in accordance with the downlink control information.

According to some embodiments, the system information comprises a number of system information portions, and wherein the network-side device is further configured to: configure the downlink control information transmission indicating the number of system information portions are transmitted by the same TRP, or configure the downlink control information indicating the number of system information portions are transmitted by different TRPs and the system information portions from the same TRP are contained in the same system information transmission window.

Yet another set of embodiments may include an apparatus, comprising: a processor configured to cause a wireless device to: receive a downlink control information transmission at least scheduling downlink hybrid automatic repeat request (HARQ) transmissions from a plurality of transmission reception points (TRPs); and receive downlink HARQ transmissions from the plurality of TRPs in accordance with the downlink control information transmission.

According to some embodiments, the processor can cause the wireless device to implement any or all parts of any of the preceding embodiments/examples.

Yet another set of embodiments may include an apparatus, comprising: a processor configured to cause a network-side device to: provide a downlink control information transmission at least scheduling downlink hybrid automatic repeat request (HARQ) transmissions from a plurality of transmission reception points (TRPs) to a wireless device; and provide at least one downlink HARQ transmission to the wireless device in accordance with the downlink control information.

According to some embodiments, the processor can cause the network side device to implement any or all parts of any of the preceding embodiments/examples.

Yet another set of embodiments may include a method for a wireless device, comprising: receiving a downlink control information transmission at least scheduling downlink hybrid automatic repeat request (HARQ) transmissions from a plurality of transmission reception points (TRPs); and receiving downlink HARQ transmissions from the plurality of TRPs in accordance with the downlink control information transmission.

According to some embodiments, the method can be further performed by the wireless device to implement any or all parts of any of the preceding embodiments/examples.

Yet another set of embodiments may include a method for a network-side device, comprising: providing a downlink control information transmission at least scheduling downlink hybrid automatic repeat request (HARQ) transmissions from a plurality of transmission reception points (TRPs) to a wireless device; and providing at least one downlink HARQ transmission to the wireless device in accordance with the downlink control information.

According to some embodiments, the method can be further performed by the network side device to implement any or all parts of any of the preceding embodiments/ examples.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising by a device: performing any or all parts of the preceding examples.

A yet further exemplary embodiment may include a non-transitory computer accessible memory medium comprising program instructions which, when executed at a device, cause the device to implement any or all parts of any of the preceding examples.

A yet further exemplary embodiment may include a device comprising: a processor, and a computer-readable storage medium, having program instructions stored thereon, which, when executed, cause the device to implement any or all parts of any of the preceding examples.

A still further exemplary embodiment may include a computer program product comprising instructions for performing any or all parts of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio coupled to the at least one antenna; and
a processor coupled to the at least one radio;
wherein the processor is configured to:
receive a downlink control information transmission at least scheduling downlink hybrid automatic repeat request (HARQ) transmissions from a plurality of transmission reception points (TRPs),
wherein the downlink control information transmission comprises a HARQ process indicator, a TRP indicator, and a new data indicator for each HARQ process,
wherein HARQ processes corresponding to different TRPs of the plurality of TRPs have a same first HARQ process indicator assigned thereto, and wherein corresponding new data indicators for the HARQ processes indicate that data re-transmitted by the HARQ processes is different from each other; and
receive downlink HARQ transmissions from the plurality of TRPs in accordance with the downlink control information transmission.

2. The wireless device of claim 1, wherein the processor is further configured to:
receive a second downlink control information transmission comprising a HARQ process indicator and a TRP indicator for each HARQ process, wherein HARQ processes corresponding to different TRP indicators are assigned different HARQ process indicators.

3. The wireless device of claim 1, wherein the processor is further configured to:
receive a second downlink control information transmission comprising a HARQ process indicator and a TRP indicator for each HARQ process, wherein second HARQ processes corresponding to different TRP indicators have a same second HARQ process indicator assigned thereto; and
acquire second data re-transmitted by the second HARQ processes corresponding to the different TRP indicators and the same second HARQ process indicator, wherein the second data is a size smaller than a specific threshold.

4. The wireless device of claim 3, wherein the specific threshold is preset fixedly, or reported by the wireless device based on a maximum payload size the wireless device is capable of processing for the second HARQ processes from different TRPs that can be scheduled by the same second HARQ process indicator.

5. The wireless device of claim 1,
wherein the processor is further configured to:
process the data re-transmitted corresponding to the different TRPs and the same first HARQ indicator wherein the processing satisfies a minimum performance requirement the wireless device is required to meet.

6. The wireless device of claim 3, wherein the second downlink control information transmission further comprises a redundancy version (RV) configuration information for each HARQ process, wherein the RV configuration information for the second HARQ processes corresponding to the different TRP indicators and the same second HARQ process indicator indicates that the second data re-transmitted and indicated by the RV configuration information is self-decodable, and
wherein the processor is further configured to:
self-decode the second data.

7. The wireless device of claim 1, wherein the downlink control information transmission further schedules downlink system information (SI) transmissions from the plurality of TRPs.

8. The wireless device of claim 7,
wherein a SI transmission of the SI transmissions comprises a number of system information blocks (SIBs),
wherein the downlink control information transmission indicates a mapping relationship between the number of SIBs transmitted by a same TRP of the plurality of TRPs, or
wherein the downlink control information transmission indicates the number of SIBs transmitted by different TRPs of the plurality of TRPs, wherein the number of SIBs from the same TRP are contained in a same SI transmission window.

9. A network-side device, comprising:
at least one antenna;
at least one radio coupled to the at least one antenna; and
a processor coupled to the at least one radio,
wherein the processor is configured to:
provide a downlink control information transmission scheduling downlink hybrid automatic repeat request (HARQ) transmissions from a plurality of transmission reception points (TRPs) to a wireless device,
wherein the downlink control information transmission comprises a HARQ process indicator, a TRP indicator, and a new data indicator for each HARQ process,
wherein HARQ processes corresponding to different TRPs of the plurality of TRPs have a same first HARQ process indicator assigned thereto, and wherein corresponding new data indicators for the HARQ processes are different from each other; and
provide at least one downlink HARQ transmission to the wireless device in accordance with the downlink control information transmission.

10. The network-side device of claim 9, wherein the processor is further configured to:
configure a second downlink control information transmission comprising a HARQ process indicator and a TRP indicator for each HARQ process, wherein HARQ processes corresponding to different TRP indicators are assigned different HARQ process indicators.

11. The network-side device of claim 9, wherein the processor is further configured to:
configure a second downlink control information transmission comprising a HARQ process indicator and a TRP indicator for each HARQ process, wherein second HARQ processes corresponding to different TRP indicators have a same second HARQ process indicator assigned thereto; and
provide, in a second downlink HARQ transmission, second data to be re-transmitted corresponding to the different TRP indicators and the same second HARQ process indicator, wherein the second data is a size smaller than a specific threshold.

12. The network-side device of claim 9, wherein the processor is further configured to:
provide, in the at least one downlink HARQ transmission, data to be re-transmitted corresponding to the different TRPs and the same first HARQ indicator wherein the data is configured based on a minimum performance requirement the wireless device is required to meet.

13. The network-side device of claim 11, wherein the processor is further configured to:

configure the second downlink control information transmission comprising a redundancy version (RV) configuration information for each HARQ process, wherein the RV configuration information for the second HARQ processes corresponding to the different TRP indicators and the same second HARQ process indicator indicates that the second data re-transmitted and indicated by the RV configuration information are self-decodable; and provide, in the second downlink HARQ transmission, the second data in accordance with the RV configuration information.

14. The network-side device of claim 9, wherein the processor is further configured to:
wherein the downlink control information transmission further comprises downlink system information (SI) transmissions from the plurality of TRPs to the wireless device, provide at least one downlink SI transmission to the wireless device in accordance with the downlink control information transmission.

15. The network-side device of claim 14, wherein a SI transmission of the SI transmissions comprises a number of system information blocks (SIBs), the processor is further configured to:
configure the downlink control information transmission indicating the number of SIBs are transmitted by a same TRP of the plurality of TRPs, or configure the downlink control information transmission indicating the number of SIBs is transmitted by different TRPs of the plurality of TRPs, wherein the number of SIBs from a same TRP are contained in a same system information transmission window.

16. An apparatus, comprising:
a processor configured to cause a wireless device to:
receive a downlink control information transmission at least scheduling downlink hybrid automatic repeat request (HARQ) transmissions from a plurality of transmission reception points (TRPs), wherein the downlink control information transmission comprises a HARQ process indicator and a TRP indicator for each HARQ process, and wherein HARQ processes corresponding to different TRPs of the plurality of TRPs have a same HARQ process indicator assigned thereto, the processor is further configured to:

acquire data re-transmitted by the HARQ processes based at least on a minimum performance configuration of the wireless device; and receive downlink HARQ transmissions from the plurality of TRPs in accordance with the downlink control information transmission.

17. The apparatus of claim 16, wherein the downlink control information transmission comprises a new data indicator for each HARQ process, wherein new data indicators for the HARQ processes corresponding to the different TRPs and the same HARQ process indicator indicates the data re-transmitted by the HARQ processes is different from each other.

18. The apparatus of claim 16, wherein the processor is further configured to:
acquire the data re-transmitted corresponding to different TRP indicators and the same HARQ process indicator, wherein the data is a size smaller than a specific threshold.

19. The apparatus of claim 16, wherein the downlink control information transmission comprises a redundancy version (RV) configuration information for each HARQ process, wherein the RV configuration information for the HARQ processes corresponding to the different TRPs and the same HARQ process indicator indicates that the data re-transmitted and indicated by the RV configuration information is self-decodable, the processor is further configured to self-decode the data.

20. The apparatus of claim 16, wherein the downlink control information transmission further schedules downlink system information (SI) transmissions from the plurality of TRPs,
wherein a SI transmission of the SI transmissions comprises a number of system information blocks (SIBs), wherein the downlink control information transmission indicates a mapping relationship between the number of SIBs-transmitted by a same TRP of the plurality of TRPs, or wherein the downlink control information transmission indicates the number of SIBs transmitted by different TRPs of the plurality of TRPs, wherein the number of SIBs from the same TRP are contained in a same SI transmission window.

\* \* \* \* \*